US011470786B2

(12) United States Patent
Ofray

(10) Patent No.: US 11,470,786 B2
(45) Date of Patent: Oct. 18, 2022

(54) SYSTEMS FOR FACILITATING ARTIFICIAL CLIMATE CONTROL

(71) Applicant: Alvin Ofray, Greensboro, NC (US)

(72) Inventor: Alvin Ofray, Greensboro, NC (US)

( * ) Notice: Subject to any disclaimer, the term of this patent is extended or adjusted under 35 U.S.C. 154(b) by 119 days.

(21) Appl. No.: 16/880,856

(22) Filed: May 21, 2020

(65) Prior Publication Data
US 2021/0360873 A1 Nov. 25, 2021

(51) Int. Cl.
*A01G 9/24* (2006.01)
*A01G 9/22* (2006.01)

(52) U.S. Cl.
CPC ............. *A01G 9/246* (2013.01); *A01G 9/227* (2013.01); *A01G 9/247* (2013.01)

(58) Field of Classification Search
CPC ....................... A01G 9/24–29; A01G 9/22–227
See application file for complete search history.

(56) References Cited

U.S. PATENT DOCUMENTS

| 3,393,728 A * | 7/1968 | Davis ..................... A01G 9/246 165/48.1 |
| 4,869,070 A * | 9/1989 | Assaf ..................... A01G 9/246 62/94 |
| 2009/0013596 A1* | 1/2009 | Wang ........................ F26B 3/28 47/17 |
| 2015/0282440 A1* | 10/2015 | Shelor .................... A01G 9/246 47/17 |
| 2017/0071139 A1* | 3/2017 | Fence ...................... A01G 9/227 |
| 2017/0238477 A1* | 8/2017 | Lloyd ................... A01G 9/1407 |
| 2018/0017244 A1* | 1/2018 | Smith ...................... F21V 29/57 |
| 2019/0029187 A1* | 1/2019 | Brault ..................... A01G 7/045 |
| 2019/0037780 A1* | 2/2019 | Hutto ...................... F24F 8/192 |

(Continued)

FOREIGN PATENT DOCUMENTS

| CN | 101725223 | 6/2010 |
| CN | 202391167 U | 8/2012 |

(Continued)

OTHER PUBLICATIONS

Machine translation of RU-2710010-C2 (Year: 2021).*

(Continued)

*Primary Examiner* — Monica L Barlow
*Assistant Examiner* — Madeline L Douglas

(57) ABSTRACT

Disclosed herein is a system for facilitating artificial climate control, in accordance with some embodiments. Accordingly, the system may include a greenhouse enclosure, a condensation assembly, at least one sensor, a water collection compartment, and a processing device. Further, the greenhouse enclosure may include an internal space. Further, the greenhouse enclosure may be configured for generating a greenhouse effect. Further, the condensation assembly may be configured for condensing water vapor present in the interior space. Further, the condensation assembly may include at least one coolant dispenser, a heat exchanger, a coolant sensor, and at least one coolant dispensing actuator. Further, the at least one sensor may be configured for generating at least one sensor data. Further, the water collection compartment may be fluidly coupled with the condensation assembly. Further, the processing device may be communicatively coupled to each of the at least one sensor and the coolant sensor.

20 Claims, 21 Drawing Sheets

(56) References Cited

U.S. PATENT DOCUMENTS

2019/0063786 A1*   2/2019   Bowman ................ A01G 31/02
2019/0364743 A1*  12/2019   Lys ....................... F21V 23/001
2020/0000045 A1*   1/2020   Shelor .................... A01G 9/246

FOREIGN PATENT DOCUMENTS

| CN | 108174722 A  * | 6/2018 | |
|---|---|---|---|
| CN | 108265896 A | 7/2018 | |
| CN | 207863525 U | 9/2018 | |
| CN | 109419115 A | 3/2019 | |
| EP | 2730738 A1 * | 5/2014 | ............ A01G 9/227 |
| RU | 2710010 C2 * | 12/2019 | |
| WO | WO-2011125382 A1 * | 10/2011 | ............ A01G 9/249 |
| WO | WO-2021015468 A2 * | 1/2021 | ............ G06Q 50/02 |

OTHER PUBLICATIONS

Machine translation of CN-108174722-A (Year: 2021).*
Machine translation of WO-2011125382-A1 (Year: 2021).*
Machine translation of WO-2021015468-A2 (Year: 2021).*
Machine translation of EP-2730738-A1 (Year: 2021).*

* cited by examiner

SYSTEMS FOR FACILITATING ARTIFICIAL CLIMATE CONTROL

TECHNICAL FIELD OF THE INVENTION

Generally, the present disclosure relates to the field of automatic temperature and humidity regulation. More specifically, the present disclosure relates to systems for facilitating artificial climate control.

BACKGROUND OF THE INVENTION

Existing techniques for facilitating artificial climate control are deficient with regard to several aspects. For instance, current technologies do not provide a system for facilitating artificial climate control that may be operable in any weather conditions. Moreover, current technologies do not provide an automated system for facilitating growth of vegetation.

Therefore, there is a need for improved systems for facilitating artificial climate control that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating artificial climate control, in accordance with some embodiments. Accordingly, the system may include a greenhouse enclosure, a condensation assembly, at least one sensor, a water collection compartment, and a processing device. Further, the greenhouse enclosure may include an internal space. Further, the greenhouse enclosure may be configured for generating a greenhouse effect. Further, the condensation assembly may be configured for condensing water vapor present in the interior space. Further, the condensation assembly may include at least one coolant dispenser, a heat exchanger, a coolant sensor, and at least one coolant dispensing actuator. Further, the at least one coolant dispenser may be configured for dispensing a coolant. Further, the heat exchanger may be fluidly coupled with the at least one coolant dispenser. Further, the heat exchanger may be configured for receiving the coolant from the at least one coolant dispenser. Further, the heat exchanger facilitates heat exchange between the coolant and the interior space to condensing of the water vapor. Further, the coolant sensor may be configured for generating at least one coolant data. Further, the coolant sensor may be configured for detecting at least one coolant parameter. Further, the at least one coolant dispensing actuator may be operably coupled to the at least one coolant dispenser. Further, the at least one coolant dispensing actuator may be configured for controlling the dispensing of the coolant based on the at least one command. Further, the at least one sensor may be configured for generating at least one sensor data. Further, the at least one sensor may be configured for detecting at least one of at least one external environmental parameter associated with an exterior space outside the greenhouse enclosure and at least one internal environment parameter associated with the interior space. Further, the water collection compartment may be fluidly coupled with the condensation assembly. Further, the water collection compartment may be configured for storing water upon condensing of the water vapor. Further, the processing device may be communicatively coupled to each of the at least one sensor and the coolant sensor. Further, the processing device may be communicatively coupled to at least one of the at least one coolant dispensing actuator and the at least one sunshade actuator. Further, the processing device may be configured for analyzing at least one of the at least one sensor data and the at least coolant sensor data. Further, the processing device may be configured for generating the at least one command based on the analyzing. Further, at least one of the at least one coolant dispenser, at least one coolant dispensing actuator, at least one sunshade actuator, and the processing device may be electrically powered by a power source.

Further disclosed herein is a system for facilitating artificial climate control, in accordance with some embodiments. Accordingly, the system may include a greenhouse enclosure, a condensation assembly, at least one sensor, a water collection compartment, a processing device, and a power source. Further, the greenhouse enclosure may include an internal space. Further, the greenhouse enclosure configured for generating a greenhouse effect. Further, the greenhouse enclosure may include at least one sunshade panel and at least one sunshade actuator. Further, the at least one sunshade panel may be configured for blocking light from entering the interior space. Further, the at least one sunshade panel may be movably coupled to the greenhouse enclosure using a sunshade connection mechanism. Further, the at least one sunshade actuator may be operably coupled to the at least one sunshade panel. Further, the at least one sunshade actuator may be configured for transitioning the at least one sunshade panel through two or more operational states based on at least one command. Further, the at least one sunshade panel in an open operational state of the two or more operational states allows the light to enter the interior space. Further, the at least one sunshade panel in a closed operational state of the two or more operational states blocks the light to enter the interior space. Further, the condensation assembly configured for condensing water vapor present in the interior space. Further, the condensation assembly may include at least one coolant dispenser, a heat exchanger, a coolant sensor, and at least one coolant dispensing actuator. Further, the at least one coolant dispenser may be configured for dispensing a coolant. Further, the heat exchanger may be fluidly coupled with the at least one coolant dispenser. Further, the heat exchanger may be configured for receiving the coolant from the at least one coolant dispenser. Further, the heat exchanger facilitates heat exchange between the coolant and the interior space to condensing of the water vapor. Further, the coolant sensor may be configured for generating at least one coolant data. Further, the coolant sensor may be configured for detecting at least one coolant parameter. Further, the at least one coolant dispensing actuator may be operably coupled to the at least one coolant dispenser. Further, the at least one coolant dispensing actuator may be configured for controlling the dispensing of the coolant based on the at least one command. Further, the at least one sensor configured for generating at least one sensor data. Further, the at least one sensor may be configured for detecting at least one of at least one external environmental parameter associated with an exterior space outside the greenhouse enclosure and at least one internal environment parameter associated with the interior space. Further, the water collection compartment fluidly coupled with the condensation assembly. Further, the water collection compartment may be configured for storing water upon condensing of the water vapor. Further, the processing device communicatively coupled to each of the at least one sensor and the coolant sensor. Further, the processing device may be communicatively coupled to at least one of the at least one coolant dispensing actuator and the at least one sunshade actuator. Further, the processing device may be configured for analyzing at least one of the at least one sensor data and the at least coolant sensor data. Further, the processing device may be configured for generating the at least one command based on the analyzing. Further, the power source configured for powering at least one of the at least one coolant dispenser, at least one coolant dispensing actuator, at least one sunshade actuator, and the processing device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
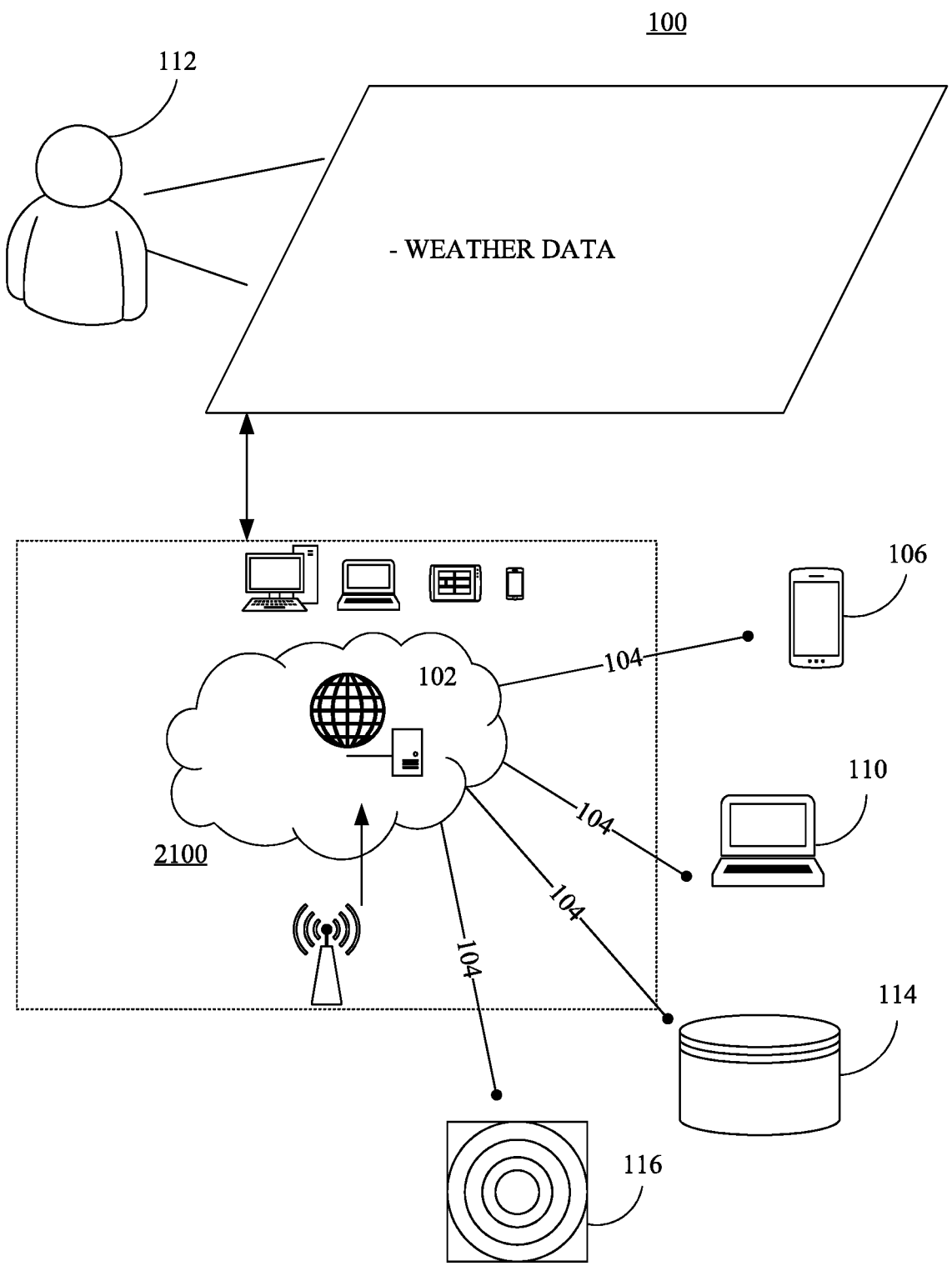
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems for facilitating artificial climate control, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems for facilitating artificial climate control. Further, the present disclosure may help reverse global warming on earth and make livable environments at the battle lines where global warming is occurring and where personnel may need emergency sustainability. Further, the need to stop global warming is urgent and the need to start taking action is urgent coinciding with natural forces is a way to recuperate where vegetation drought, river drought, dwelling drought, and farming drought is occurring.

Further, the disclosed system may include a water cooler dispenser or water cooler dispensers. Further, the water cooler dispenser or water cooler dispensers may include prefixed interior piping or tubing. Further, the water cooler dispenser or water cooler dispensers may include affixed exterior piping or tubing. Further, the amount of water in the prefixed interior piping or tubing may equal the amount of water in the affixed exterior piping or tubing. Further, when the amount of water in the prefixed interior piping or tubing is pump forced out it will force out the amount of water in affixed exterior piping or tubing. Further, the water that is forced out of affixed exterior piping or tubing will replace the water that is being pump forced out of the prefixed interior piping or tubing. Further, the prefixed interior piping or tubing pump forcing will stop when the amount of water that it contains is out. Further, if prefixed interior piping or tubing contains five gallons of water it will pump force five gallons of water out into the affixed exterior piping or tubing then stop. Further, if the affixed exterior piping or tubing contains five gallons of water it will be forced out into the prefixed interior piping or tubing then stop.

Further, the water cooler dispensers may include a first water cooler dispenser and a second water cooler dispenser. Further, the present disclosure may include parallel two-way back and forth piping or tubing from first water cooler dispenser to second water cooler dispenser then back to first water cooler dispenser. Further, the water cooler dispensers may include a first water cooler dispenser and a second water cooler dispenser or multi water cooler dispensers.

Further, instead of back and forth piping or tubing may include one-way piping or tubing from the first water cooler dispenser to the second water cooler dispenser to the multi water cooler dispensers and back to the first water cooler dispenser via outlet to inlet to outlet to inlet and so on. Further, a circular dispensing of water flow can be created then back to the first water cooler dispenser which further facilitates any formation of the piping or tubing dispensing needed. Further, back and forth piping or tubing facilitates any formation by first water cooler dispenser and second water cooler dispenser being back to back and or side to side with other first water cooler dispensers and second water cooler dispensers. Further, the water cooler dispensers may include two or multi piping or tubing outlets and inlets.

Further, piping or tubing may be only piping or only tubing. Further, the piping or tubing of present available existing products that may be used together as paralleled or coiled or one parallel one coiled or two coiled. Further, multi coiled piping or tubing may be used to increase the amount of condensation results. Further, affixed exterior piping or tubing may be coiled or formatted around a water cooler dispenser itself via outlet to inlet. Further, piping or tubing may be of hard materials or soft materials. Further, the water cooler dispensers may be used to coincide with other water dispensing products that are being used to battle global warming problems. Further, an ice maker dispenser may be used to mix ice and water to be inset into the piping or tubing via inlet ice valve to outlet offset valve. Further, liquid nitrogen dispensers may be used to freeze the piping or tubing and then inset water and or water and ice mix. Further, the result of this operation may be the condensation of water droplets for personal use in small scales or in large scales a community of greenhouses may draw cloud formations like cities often do more often than other regions. Further, and then with the presence of artificial climate control greenhouses coinciding in or near cities may result in further facilitating in raining on the cities.

Further, instead of recirculating piping and recirculating pump it may be like a powerful water cooler drinking fountain machine that may fill a piping water line that is going to another powerful water cooler drinking fountain machine. Further, at the end of the piping water line there will be a water pump motor that will stop the water flow and water will be stopped in piping very cold. Further, then when the water gets too warm and stops condensing the water pump will turn on and pump the warm water into the other powerful water cooler drinking fountain machine. Further, then cold water will move into piping then the water pump will stop when the water that is very cold moves into piping to cause condensing again. Further, the other powerful water cooler drinking fountain machine may be doing the same thing.

Further, piping may be over vegetation over the head of gardener or any place anyhow. Further, this may be used primarily for home gardening or water collection in a suitable greenhouse with panels. Further, or used inside a home as for a plant or two and or water collection with a water cooler dispenser that has affixed exterior piping or tubing coiled or formatted around the water cooler dispenser itself in miniaturized greenhouse. Further, the disclosed system may include solar panels, shine to glow light panels, breeze fan and vent panels, and heating and shield window panels, and shade screen panels that may be used accordingly. Further, a solar panel can be made that will include one or more of the variety of panels or a mixture of one or more of the variety of panels. Further, the variety of panels may use the power of the solar panels electricity to power one or more of the variety of panels. Further, the shade screen panels may be made to block and absorb the heat of the sun. Further, the shade screen panels can make a wall of shade against the high peak of the daily sunshine strongest burning period. Further, the shade screen panels made into a wall can be positioned only to block the high peak period of the sunshine strongest burning period. Further, then the sunshine passes over the angled shade screen panels and resumes sunshine. Further, heating and shield window panel can be tinted flat heating window and clear contour shield window. Further, pressurized liquid nitrogen may be injected into the heating and shield window panel to make an artificial ice block panel then with a 180 degree rotary framework hinge can be rotated upside down to go from a contour heating and shield window panel to a tinted flat artificial ice block panel. Further, the breeze fan and vent panel can be rotated 180 degree with the rotary framework hinge to go from a breeze fan panel to a vent fan panel. Further, the shade screen panels may be utilized in various sizes and thickness to shade from the burning sun square opening in the shade screen panels may allow movement of wind and rain through unlike door screen and window screen that are thin tight squares. Further, triangular shade screen panels or any of the variety of panels may be used for constructing greenhouse domes, canopies or umbrellas and panels may be any shape any size for any type of greenhouse or structure.

Further, panels may be arranged according to the type of panels needed to be one hundred percent effective to protect the water cooler dispensers and the piping or tubing from the drought of over burning of the sun and freezing problems. Further, heating and shield window panels will act as an artificial ozone layer to keep outside temperature out and inside temperature in. Further, heating element part of heating and shield window panels will entrap heat between heating and shield window panels. Further, a heating or cooling ductwork flow source may be applied to the heating and shield window panels and or standard greenhouse windows used on greenhouse structures. Further, in cool weather shine to glow light panels can be equip with luminous artificial solar radiation (evaporation) flash lighting to protect against frost in greenhouse. Further, shine to glow light panels equip with luminous artificial solar radiation (evaporation) flash lighting can be posted over solar panels to reintroduce solar power to solar panels when the absence of sun light occurs.

Further, the panels may be permanently secured or interchangeable. Further, the panels may be hinged or non-hinged. Further, hinges on triangle panels hinged to domes, canopies or umbrellas outer or middle framework edges can be pushed up from the inner center narrow edge point of the panel and be held up with the secure hold rod. Further, the secure hold rod can be manual or automatic, mechanical, electric powered, motorized, air powered, hydraulic powered, pulley system powered. Further, the panels may be utilized in heavy-duty greenhouses, buildings and farming or medium-duty for homes and gardens or light duty for personalizing. Further, small scale greenhouse uses can be cart portable from inside home to outside home then back to inside home. Further, large scale greenhouse uses can be cart portable motorized or pulled on rail track with motorized pulley system from one side of crop field to the other side of the crop field then back to the other side of the crop field. Further, greenhouses that are portable or stationery can coincide with irrigation systems in severe need of watering crops or providing water to irrigation systems.

FIG. 1 is an illustration of an online platform 100 consistent with various embodiments of the present disclosure. By way of non-limiting example, the online platform 100 to facilitate artificial climate control may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 2100.

Figure 2:
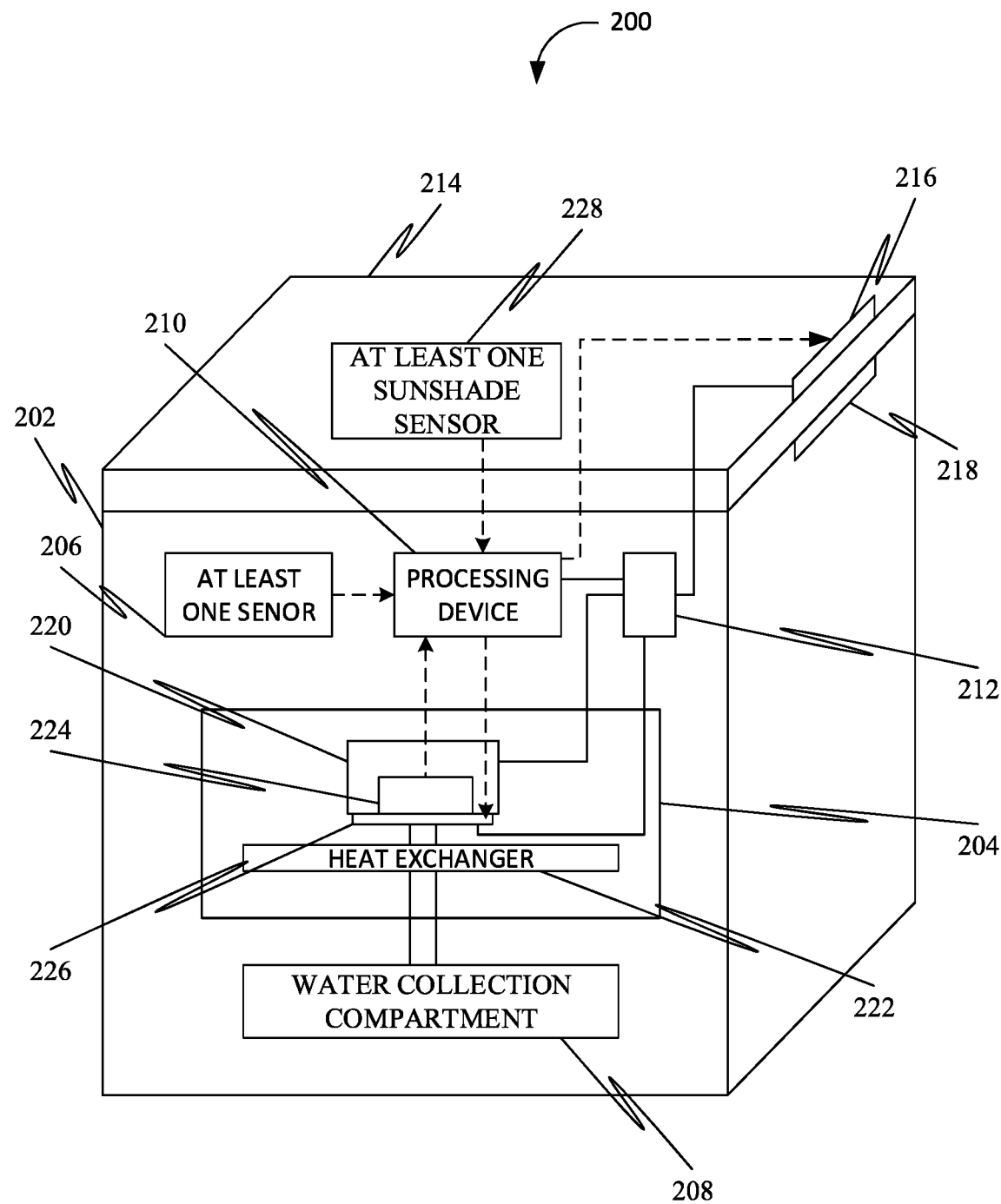
FIG. 2 is a block diagram of a system for facilitating artificial climate control, in accordance with some embodiments.

FIG. 2 is a block diagram of a system 200 for facilitating artificial climate control, in accordance with some embodiments. Accordingly, the system 200 may include a greenhouse enclosure 202, a condensation assembly 204, at least one sensor 206, a water collection compartment 208, and a processing device 210.

Further, the greenhouse enclosure 202 may include an internal space. Further, the greenhouse enclosure may be configured for generating a greenhouse effect. Further, in some embodiments, the greenhouse enclosure 202 may include at least one sunshade panel 214 and at least one sunshade actuator 216. Further, the at least one sunshade panel 214 may be configured for blocking light from entering the interior space. Further, the at least one sunshade panel 214 may be movably coupled to the greenhouse enclosure 202 using a sunshade connection mechanism 218. Further, the sunshade connection mechanism 218 may include a standard hinge, a standard roll side hinge, and a geared roll side hinge that may be operated manually or automatically using a motor. Further, the at least one sunshade actuator 216 may be operably coupled to the at least one sunshade panel 214. Further, the at least one sunshade actuator 216 may be configured for transitioning the at least one sunshade panel 214 through two or more operational states based on at least one command. Further, the at least one sunshade panel 214 in an open operational state of the two or more operational states allows the light to enter the interior space. Further, the at least one sunshade panel 214 in a closed operational state of the two or more operational states blocks the light to enter the interior space.

Further, the condensation assembly 204 may be configured for condensing water vapor present in the interior space. Further, the condensation assembly 204 may include at least one coolant dispenser 220, a heat exchanger 222, a coolant sensor 224, and at least one coolant dispensing actuator 226. Further, the at least one coolant dispenser 220 may be configured for dispensing a coolant. Further, the coolant may include at least one of liquid nitrogen, chlorofluorocarbon (CFC), hydro-chlorofluorocarbon (HCFC), hydrofluorocarbons (HFC), and water. Further, the heat exchanger 222 may be fluidly coupled with the at least one coolant dispenser 220. Further, the heat exchanger 222 may be configured for receiving the coolant from the at least one coolant dispenser 220. Further, the heat exchanger 222 facilitates heat exchange between the coolant and the interior space to condensing of the water vapor. Further, the coolant sensor 224 may be configured for generating at least one coolant data. Further, the coolant sensor 224 may be configured for detecting at least one coolant parameter. Further, the at least one coolant parameter may include temperature, quantity, etc. of the coolant. Further, the at least one coolant dispensing actuator 226 may be operably coupled to the at least one coolant dispenser 220. Further, the at least one coolant dispensing actuator 226 may be configured for controlling the dispensing of the coolant based on the at least one command.

Further, the at least one sensor 206 may be configured for generating at least one sensor data. Further, the at least one sensor 206 may be configured for detecting at least one of at least one external environmental parameter associated with an exterior space outside the greenhouse enclosure 202 and at least one internal environment parameter associated with the interior space.

Further, the water collection compartment 208 may be fluidly coupled with the condensation assembly 204. Further, the water collection compartment 208 may be configured for storing water upon condensing of the water vapor.

Further, the processing device 210 may be communicatively coupled to each of the at least one sensor 206 and the coolant sensor 224. Further, the processing device 210 may be communicatively coupled to at least one of the at least one coolant dispensing actuator 226 and the at least one sunshade actuator 216. Further, the processing device 210 may be configured for analyzing at least one of the at least one sensor data and the at least coolant sensor data. Further, the processing device 210 may be configured for generating the at least one command based on the analyzing. Further, at least one of the at least one coolant dispenser 220, at least one coolant dispensing actuator 226, at least one sunshade actuator 216, and the processing device 210 may be electrically powered by a power source 212.

Further, in some embodiments, the system 200 further may include a water dispenser (not shown) coupled with the water collection compartment 208 for dispensing the water for coinciding drip irrigation.

Further, in some embodiments, the system 200 further may include a humidifier (not shown) configured for humidifying the interior space.

Further, in some embodiments, the at least one sunshade panel 214 may include at least one sunshade sensor 228 communicatively coupled with the processing device 210. Further, the at least one sunshade sensor 228 may be configured for sensing the two or more operational states associated with the at least one sunshade panel 214. Further, the generating of the at least one command may be based on the sensing of the two or more operational states.

Further, in some embodiments, the power source 212 may include a rechargeable power source. Further, the at least one sunshade panel 214 may include a solar panel configured for generating electric power. Further, the electric power charges the rechargeable power source.

Further, in some embodiments, the system 200 further may include a vegetation sensor (not shown) configured for sensing a health condition of vegetation disposed in the interior space. Further, the vegetation sensor may be communicatively coupled with the processing device 210. Further, the generating of the at least one command may be further based on the sensing of the health condition.

Further, in some embodiments, the at least one sunshade panel 214 may include at least one of at least one light panel, at least one breeze fan panel, at least one vent panel, at least one heating panel, and at least one shield window panel.

Further, in some embodiments, the heat exchanger 222 may include a conduit configured for allowing passage of the coolant.

Further, in some embodiments, the sunshade connection mechanism 218 may include one of a plate hinge, a roll side hinge, a motorized geared roll side hinge, and a geared roll side hinge.

Further, in some embodiments, the at least one sunshade panel 214 may be characterized by a geometrical contour. Further, the geometrical contour may include one of a triangle, a square, and a rectangle.

Figure 3:
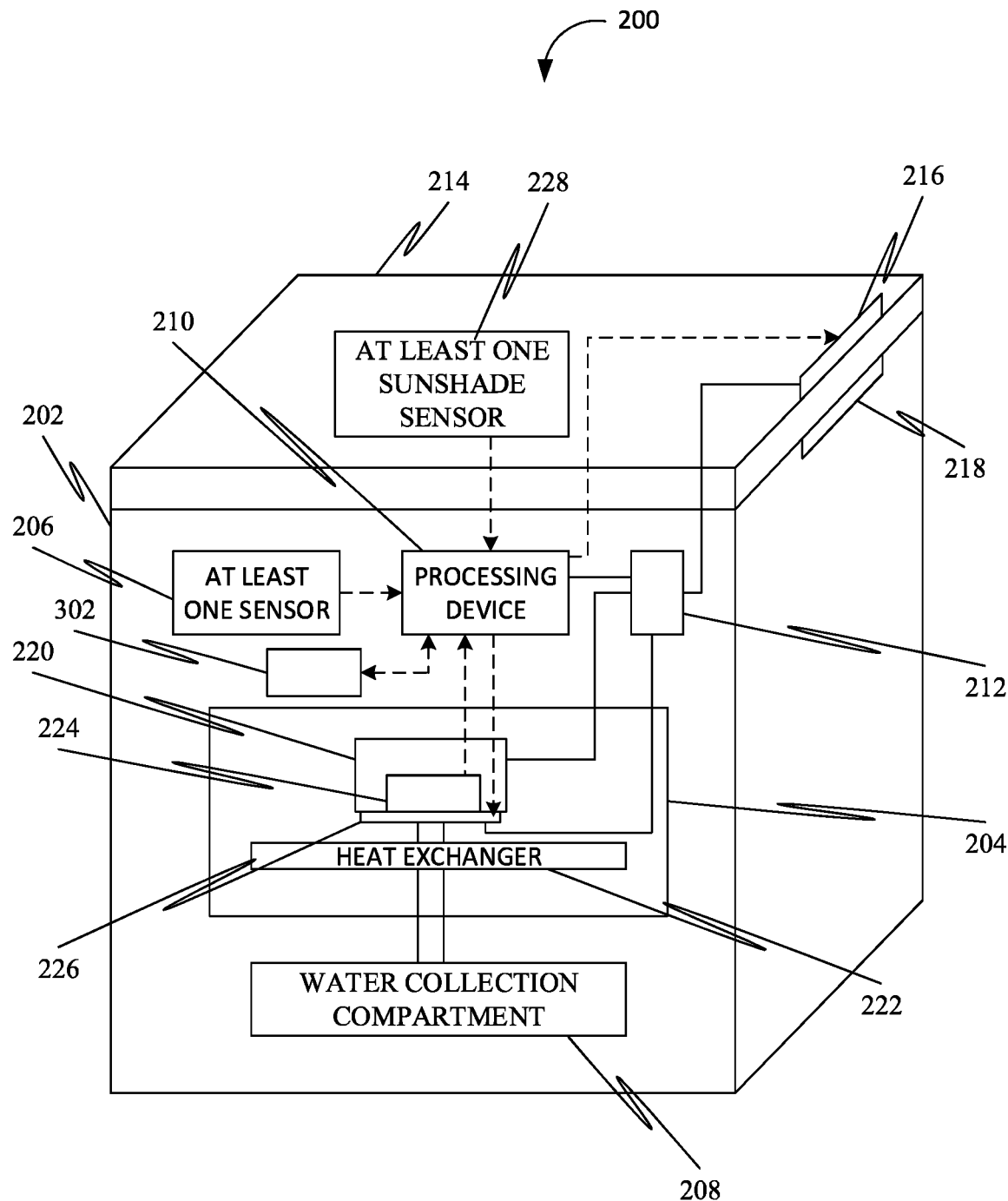
FIG. 3 is a block diagram of the system for facilitating artificial climate control, in accordance with some embodiments.

Further, in some embodiments, the system 200 further may include a communication device 302, as shown in FIG. 3. Further, the communication device 302 may be configured for receiving at least one weather data from at least one first external device. Further, the processing device 210 may be further configured for analyzing the at least one weather data. Further, the generating of the at least one command may be based on the analyzing of the at least one weather data. Further, in some embodiments, the processing device 210 may be configured for generating an emergency weather notification based on the analyzing of the at least one weather data. Further, the communication device 302 may be configured for transmitting the emergency weather notification to at least one second external device.

Further, in some embodiments, the system 200 further may include a presentation device (not shown) communicatively coupled to the processing device 210. Further, the processing device 210 may be configured for determining at least one of an external environment parameter, an internal environment parameter, and a coolant parameter based on the analyzing. Further, the presentation device may be configured for presenting the at least one of the external environment parameter, the internal environment parameter, and the coolant parameter.

FIG. 3 is a block diagram of a system 200 for facilitating artificial climate control, in accordance with some embodiments.

Figure 4:
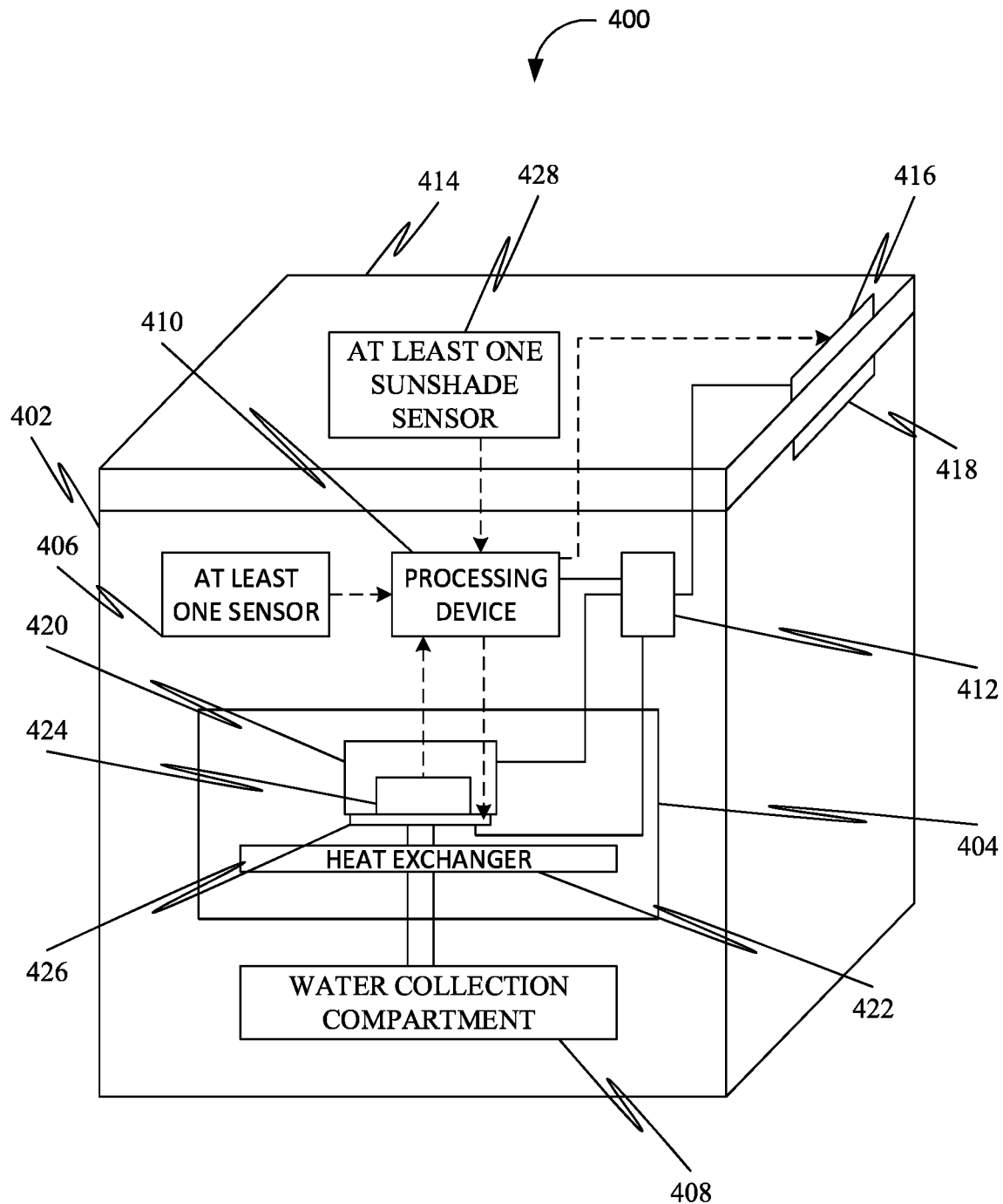
FIG. 4 is a block diagram of a system for facilitating artificial climate control, in accordance with some embodiments.

FIG. 4 is a block diagram of a system 400 for facilitating artificial climate control, in accordance with some embodiments. Accordingly, the system 400 may include a greenhouse enclosure 402, a condensation assembly 404, at least one sensor 406, a water collection compartment 408, a processing device 410, and a power source 412.

Further, the greenhouse enclosure 402 may include an internal space. Further, the greenhouse enclosure configured for generating a greenhouse effect. Further, the greenhouse enclosure 402 may include at least one sunshade panel 414 and at least one sunshade actuator 416. Further, the at least one sunshade panel 414 may be configured for blocking light from entering the interior space. Further, the at least one sunshade panel 414 may be movably coupled to the greenhouse enclosure 402 using a sunshade connection mechanism 418. Further, the sunshade connection mechanism 418 may include a standard hinge, a standard roll side hinge, and a geared roll side hinge that may be operated manually or automatically using a motor.

Further, in some embodiments, the at least one sunshade panel 414 may be characterized by a geometrical contour. Further, the geometrical contour may include one of a triangle, a square, and a rectangle. Further, the at least one sunshade actuator 416 may be operably coupled to the at least one sunshade panel 414. Further, the at least one sunshade actuator 416 may be configured for transitioning the at least one sunshade panel 414 through two or more operational states based on at least one command. Further, the at least one sunshade panel 414 in an open operational state of the two or more operational states allows the light to enter the interior space. Further, the at least one sunshade panel 414 in a closed operational state of the two or more operational states blocks the light to enter the interior space.

Further, the condensation assembly 404 configured for condensing water vapor present in the interior space. Further, the condensation assembly 404 may include at least one coolant dispenser 420, a heat exchanger 422, a coolant sensor 424, and at least one coolant dispensing actuator 426. Further, the at least one coolant dispenser 420 may be configured for dispensing a coolant. Further, the coolant may include one of liquid nitrogen, chlorofluorocarbon (CFC), hydro-chlorofluorocarbon (HCFC), hydrofluorocarbons (HFC), and water. Further, the heat exchanger 422 may be fluidly coupled with the at least one coolant dispenser 420. Further, the heat exchanger 422 may be configured for receiving the coolant from the at least one coolant dispenser 420. Further, the heat exchanger 422 facilitates heat exchange between the coolant and the interior space to condensing of the water vapor. Further, the coolant sensor 424 may be configured for generating at least one coolant data. Further, the coolant sensor 424 may be configured for detecting at least one coolant parameter. Further, the at least one coolant parameter may include temperature, quantity, etc. of the coolant. Further, the at least one coolant dispensing actuator 426 may be operably coupled to the at least one coolant dispenser 420. Further, the at least one coolant dispensing actuator 426 may be configured for controlling the dispensing of the coolant based on the at least one command.

Further, the at least one sensor 406 configured for generating at least one sensor data. Further, the at least one sensor 406 may be configured for detecting at least one of at least one external environmental parameter associated with an exterior space outside the greenhouse enclosure 402 and at least one internal environment parameter associated with the interior space.

Further, the water collection compartment 408 fluidly coupled with the condensation assembly 404. Further, the water collection compartment 408 may be configured for storing water upon condensing of the water vapor.

Further, the processing device 410 communicatively coupled to each of the at least one sensor 406 and the coolant sensor 424. Further, the processing device 410 may be communicatively coupled to at least one of the at least one coolant dispensing actuator 426 and the at least one sunshade actuator 416. Further, the processing device 410 may be configured for analyzing at least one of the at least one sensor data and the at least coolant sensor data. Further, the processing device 410 may be configured for generating the at least one command based on the analyzing.

Further, the power source 412 configured for powering at least one of the at least one coolant dispenser 420, at least one coolant dispensing actuator 426, at least one sunshade actuator 416, and the processing device 410.

Further, in some embodiments, the system 400 further may include a water dispenser (not shown) coupled with the water collection compartment 408 for dispensing the water for coinciding drip irrigation.

Further, in some embodiments, the system 400 further may include a humidifier (not shown) configured for humidifying the interior space.

Further, in some embodiments, the at least one sunshade panel 414 may include at least one sunshade sensor 428 communicatively coupled with the processing device 410.

Further, the at least one sunshade sensor 428 may be configured for sensing the two or more operational states associated with the at least one sunshade panel 414. Further, the generating of the at least one command may be based on the sensing of the two or more operational states.

Further, in some embodiments, the power source 412 may include a rechargeable power source. Further, the at least one sunshade panel 414 may include a solar panel configured for generating electric power. Further, the electric power charges the rechargeable power source.

Further, in some embodiments, the system 400 further may include a vegetation sensor (not shown) configured for sensing a health condition of vegetation disposed in the interior space. Further, the vegetation sensor may be communicatively coupled with the processing device 410. Further, the generating of the at least one command may be further based on the sensing of the health condition.

Further, in some embodiments, the heat exchanger 422 may include a conduit configured for allowing passage of the coolant.

Figure 5:
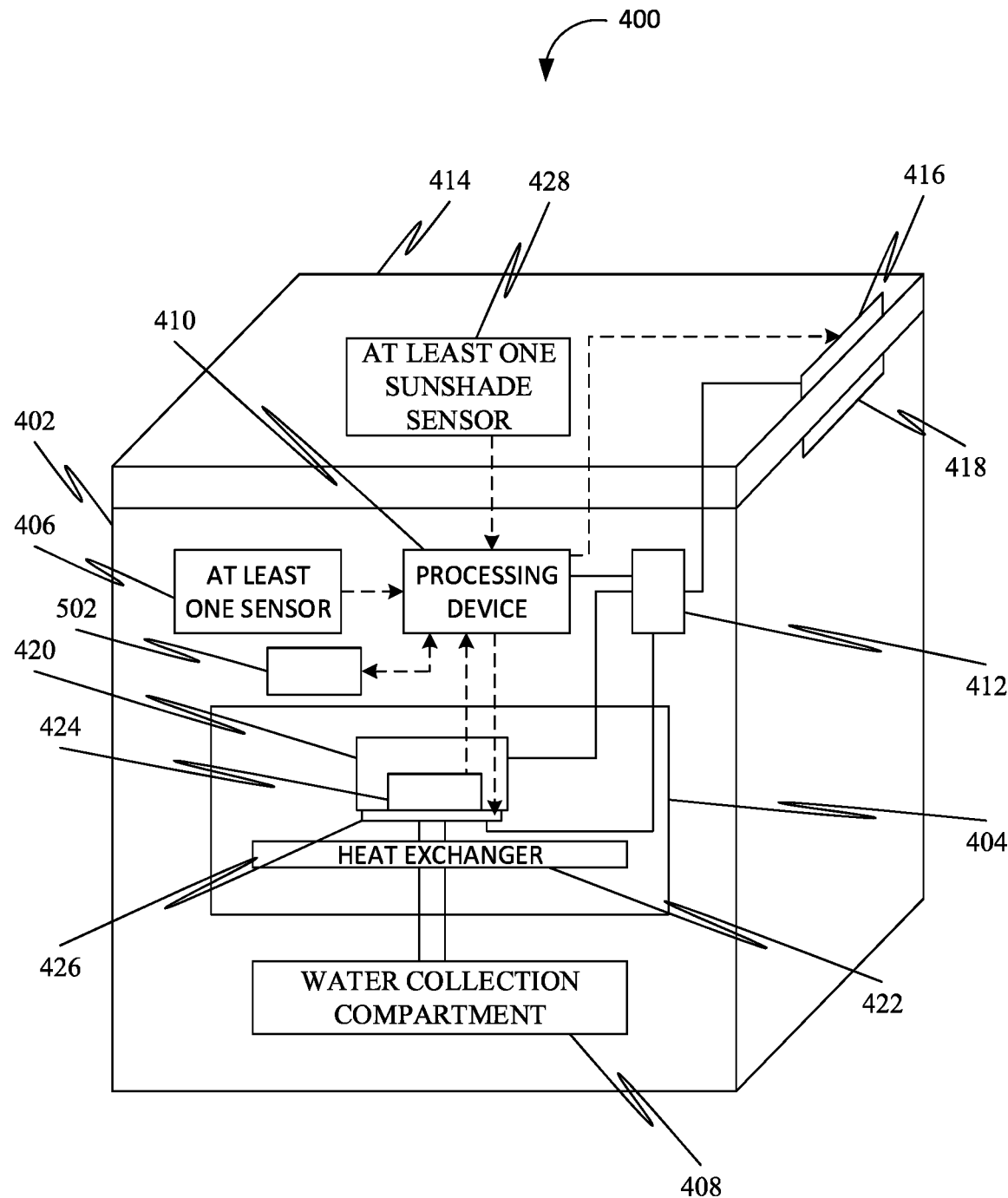
FIG. 5 is a block diagram of the system for facilitating artificial climate control, in accordance with some embodiments.

Further, in some embodiments, the system 400 further may include a communication device 502, as shown in FIG. 5. Further, the communication device 502 may be configured for receiving at least one weather data from at least one first external device. Further, the processing device 410 may be further configured for analyzing the at least one weather data. Further, the generating of the at least one command may be based on the analyzing of the at least one weather data.

Further, in some embodiments, the system 400 further may include a presentation device communicatively coupled to the processing device 410. Further, the processing device 410 may be configured for determining at least one of an external environment parameter, an internal environment parameter, and a coolant parameter based on the analyzing. Further, the presentation device may be configured for presenting at least one of the external environment parameter, the internal environment parameter, and the coolant parameter.

FIG. 5 is a block diagram of the system 400 for facilitating artificial climate control, in accordance with some embodiments.

Figure 6:
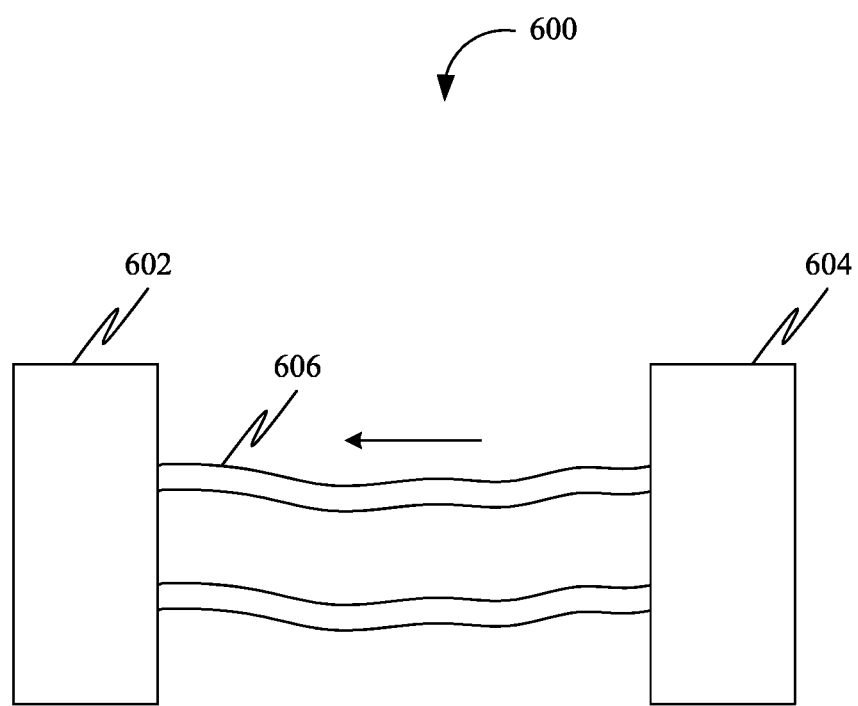
FIG. 6 is a front view of a water cooler dispenser machine, in accordance with some embodiments.

FIG. 6 is a front view of a water cooler dispenser machine 600, in accordance with some embodiments. Accordingly, the water cooler dispensing machine 600 may include a plurality of water cooler dispensers 602-604. Further, the plurality of water cooler dispensers 602-604 may include a first water cooler dispenser and a second water cooler dispenser. Further, the water cooler dispensing machine 600 may be constructed with a cryogenic material.

Further, the first water cooler dispenser may be full of refrigerated water. Further, piping 606 (or tubing) may be connected to an outlet of the first water cooler dispenser that may be extended to a second water cooler dispenser water inlet. Further, the piping or tubing 606 may be full of water that is not being refrigerated. Further, the water in the plurality of water cooler dispensers 602-604 and the water in the piping or tubing 606 is not moving. Further, the water in the plurality of water cooler dispensers 602 being refrigerated may not be dispensed in the piping 606. When the plurality of water cooler dispensers 602-604 are turned on, the plurality of water cooler dispensers 602-604 may dispense the refrigerated water out into the piping 606 via the outlet of the plurality of water cooler dispensers 602-604 and force the water in the piping or tubing 606 out into the inlet of the plurality of water cooler dispensers 602-604. When a set rate of water is dispensed from the plurality of water cooler dispensers 602-604, the plurality of water cooler dispensers 602-604 may stop dispensing and start cooling or refrigerating the water that came from the piping or tubing 606. When the piping or tubing 606 gets filled with the refrigerated water, the dispensing of the water may be stopped. Further, the contrast between the refrigerated water inside the piping or tubing 606 and outer atmosphere air may cause condensation to occur. When the water inside the piping or tubing 606 starts to get too warm to condense, a manual or automatic thermometer programming smart technology may cause the plurality of water cooler dispensers 602-604 to repeat the dispensing of refrigerated water into the piping or tubing 606 and moving the water inside the piping or tubing 606.

Figure 7:
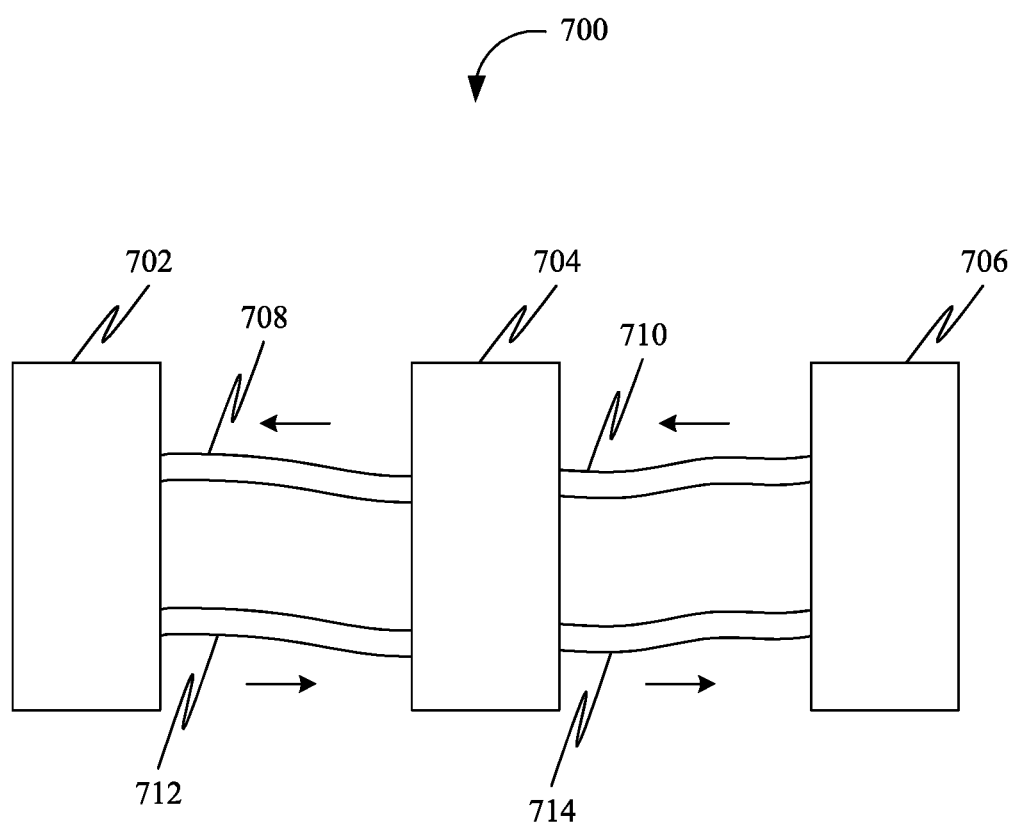
FIG. 7 is a front view of a water cooler dispenser machine, in accordance with some embodiments.

FIG. 7 is a front view of a water cooler dispenser machine 700, in accordance with some embodiments. Further, the water cooler dispenser machine 700 may include a plurality of water cooler dispensers 702-706. Further, the plurality of water cooler dispensers 702-706 may include a first water cooler dispenser, a second water cooler dispenser, and a third water cooler dispenser. Further, the water cooler dispenser machine 700 may include a plurality of piping 708-714.

Figure 8:
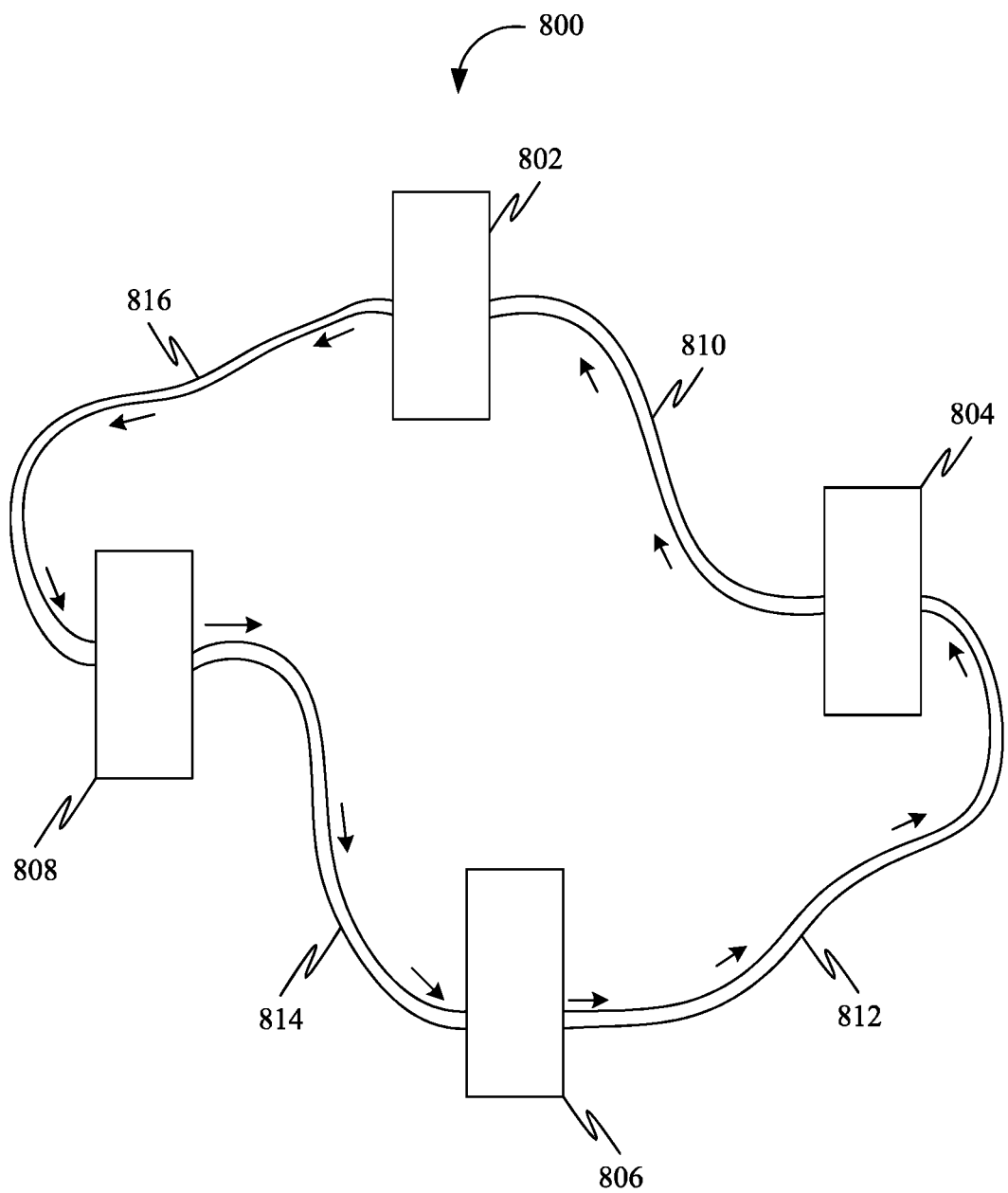
FIG. 8 is a front view of a water cooler dispenser machine, in accordance with some embodiments.

FIG. 8 is a front view of a water cooler dispenser machine 800, in accordance with some embodiments. Further, the water cooler dispenser machine 800 may include a plurality of water cooler dispensers 802-808. Further, the plurality of water cooler dispensers 802-808 may include a first water cooler dispenser, a second water cooler dispenser, a third water cooler dispenser, and fourth water cooler dispenser. Further, the water cooler dispenser machine 800 may include a plurality of piping 810-816. Further, a first piping 810 of the plurality of piping 810-816 may be attached between the first water cooler dispenser and the second water cooler dispenser. Further, a second piping 812 of the plurality of piping 810-816 may be attached between the second water cooler dispenser and the third water cooler dispenser. Further, a third piping 814 of the plurality of piping 810-816 may be attached between the third water cooler dispenser and the fourth water cooler dispenser. Further, a fourth piping 816 of the plurality of piping 810-816 may be attached between the fourth water cooler dispenser and the first water cooler dispenser. Further, the plurality of piping 810-816 facilitates condensation of water vapor present in an environment surrounding the plurality of piping 810-816.

Figure 9:
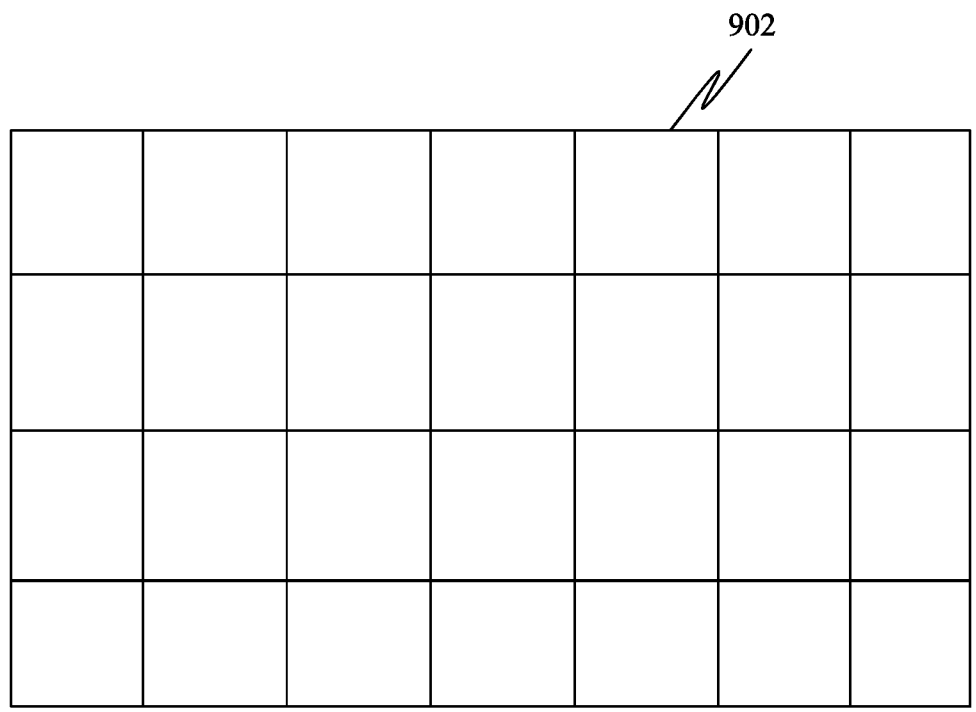
FIG. 9 is a top view of a panel, in accordance with some embodiments.

FIG. 9 is a top view of a panel 902, in accordance with some embodiments. Further, the panel may include a plurality of square foot panels. Further, the plurality of square foot panels may include solar panels, shine to glow light panels, breeze fan and vent panels, and heating and shield window panels. Further, the shine to glow light panels may include an available light panel that may be able to change from bright lighting to low lighting or to a glow. Further, the breeze fan and vent panels may include any available fan or vent fan that may be able to reverse air direction from going inside to outside. Further, the heating and shield window panels may include any available standard windows that may be wired, insulated shatterproof that may be made like car windows that have back heating elements and front shield. Further, the heating and shield window panels may separate the cold freezing outer air and warmer inner air the heating and shield window panels may separate the hot heating outer air and cooler inner air. Further, the heating elements may include heating elements on a first window and no heating elements on a second window the heating elements may be arranged between each other the heating elements may be on first window and on second window.

Further, the heating and shield window panels may be associated with a zero percent magnification by a heating flat side and a shield flat side of heating and shield window panels. Further, heating and shield window panels shield magnification contour side is blocked by the heating flat side with tinted, obscured or (low thermal emissivity) presence the heating and shield window panels magnification may be neutralized by a heating concave side of the heating and shield window panels that may be adjustable to avoid burn point. Further, heating and shield window panels may be of oven galvanized, stainless steel, ceramic or microwave materials the heat generated by the magnification and or heating elements may be entrapped between the heating and shield window panels the heating elements of the heating and shield window panels may be of fireproof materials. Further, the heating and shield window panels may be made as magnifying windows in certain conditions that the sun's radiation shine that may cause intense magnification does not cause burning as to cause a fire conditions may be a variance of low contour level comparison of roofs and or wall windows used on structures for cold weather or high contour level uses from celestial astronomical distances further away from the sun.

Further, the plurality of square foot panels may be one square foot to make an average size panel. Further, smaller squares for smaller panels and larger squares for larger panels. Further, for instance the panel may be associated with an average size being about four foot by six-foot framework thereby the panel may include twenty-four panels. Further, the panels may be made with only solar panels or shine to glow light panels or breeze fan and vent panels or heating and shield window panels. Further, the panels may be made with a mix of the plurality of square foot panels. In the summertime, the panel may be made using mostly the breeze fan and vent panels with enough solar panels to power the breeze fan and panels. In the wintertime, the panel may be made using mostly the heating and shield window panels with enough solar panels to power the heating and shield panels. Further, the shine to glow light panels may be used to keep a bright light during the day time and a glowing light during the night time. Further, the panel may be used to protect a plurality of water cooler dispensers and piping or tubing from the climate change weather elements. Further, the panels may also be used to protect the intended purpose the condensing is being used for such as vegetation and or water collection for consumption or fill river flow for dams, etc.

Further, in some embodiments, the plurality of square foot panels may include screen panels. Further, the screen panels may be used for more moderate weather conditions made of standard screen material or industrial screen material.

Further, the panel may be characterized by a geometrical contour. Further, the geometrical contour may include one of triangle, square, and a rectangle. Further, the panel may be used in constructing a dome, a canopy, an umbrella, etc. to protect the plurality of water cooler dispensers, results being used for such as person and or vegetation, etc. Further, the panel besides being powered by the solar panels may also be power by smart technology (alternative power sources). Further, the plurality of square foot panels may be a square foot or square two feet for any size needed for any amount of panels such as four by four, etc. Further, the plurality of square foot panels may be constructed in a plurality of shapes. Further, the plurality of shapes may include one of triangle, square, and a rectangle.

Figure 10:
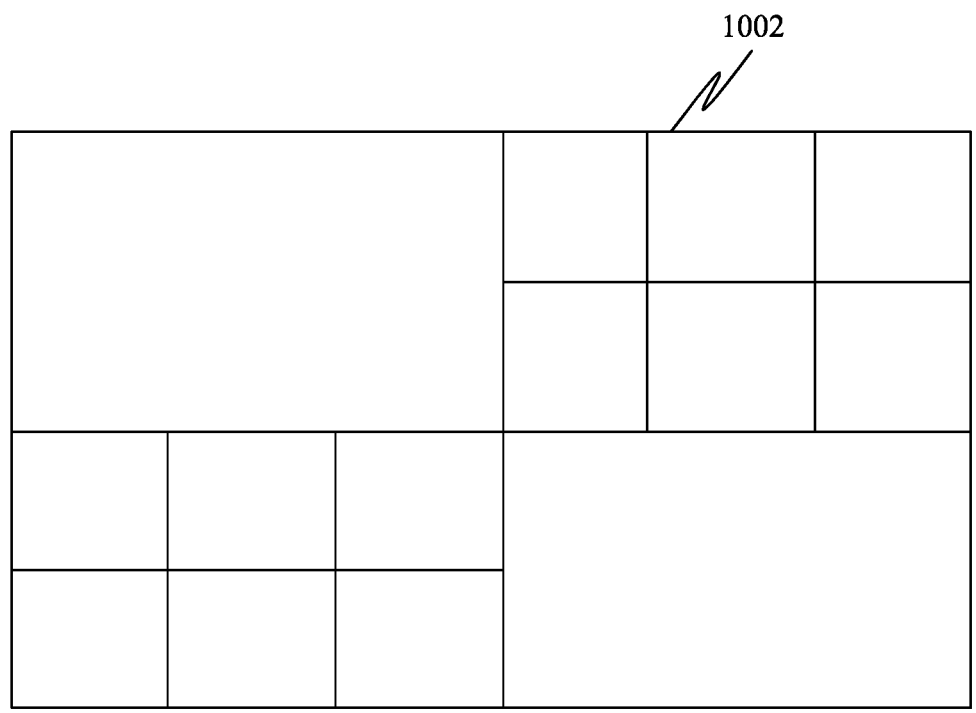
FIG. 10 is a top view of a panel, in accordance with some embodiments.

FIG. 10 is a top view of a panel 1002, in accordance with some embodiments. Further, the panel 1002 may include twelve square-foot panels. Further, the panel 1002 may include two 2×6 rectangular panels.

Figure 11:
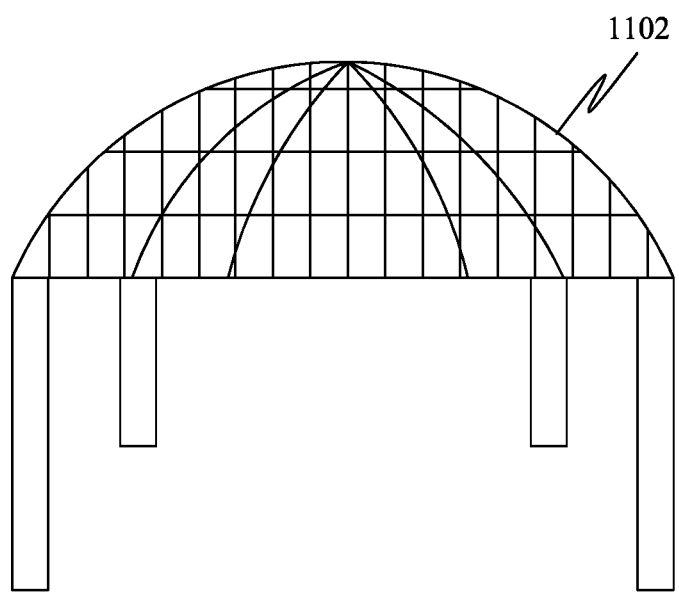
FIG. 11 is a side view of an umbrella canopy, in accordance with some embodiments.

FIG. 11 is a side view of an umbrella canopy 1102, in accordance with some embodiments.

Figure 12:
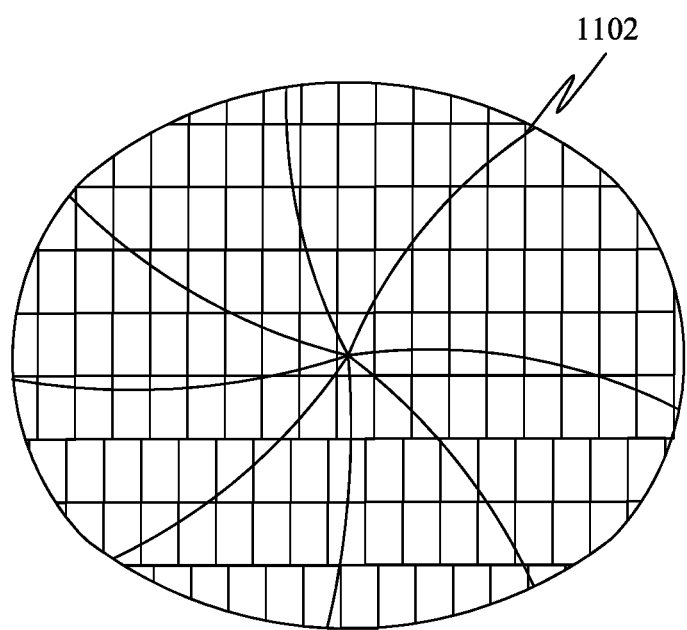
FIG. 12 is a top view of the umbrella canopy, in accordance with some embodiments.

FIG. 12 is a top view of the umbrella canopy 1102, in accordance with some embodiments.

Figure 13:
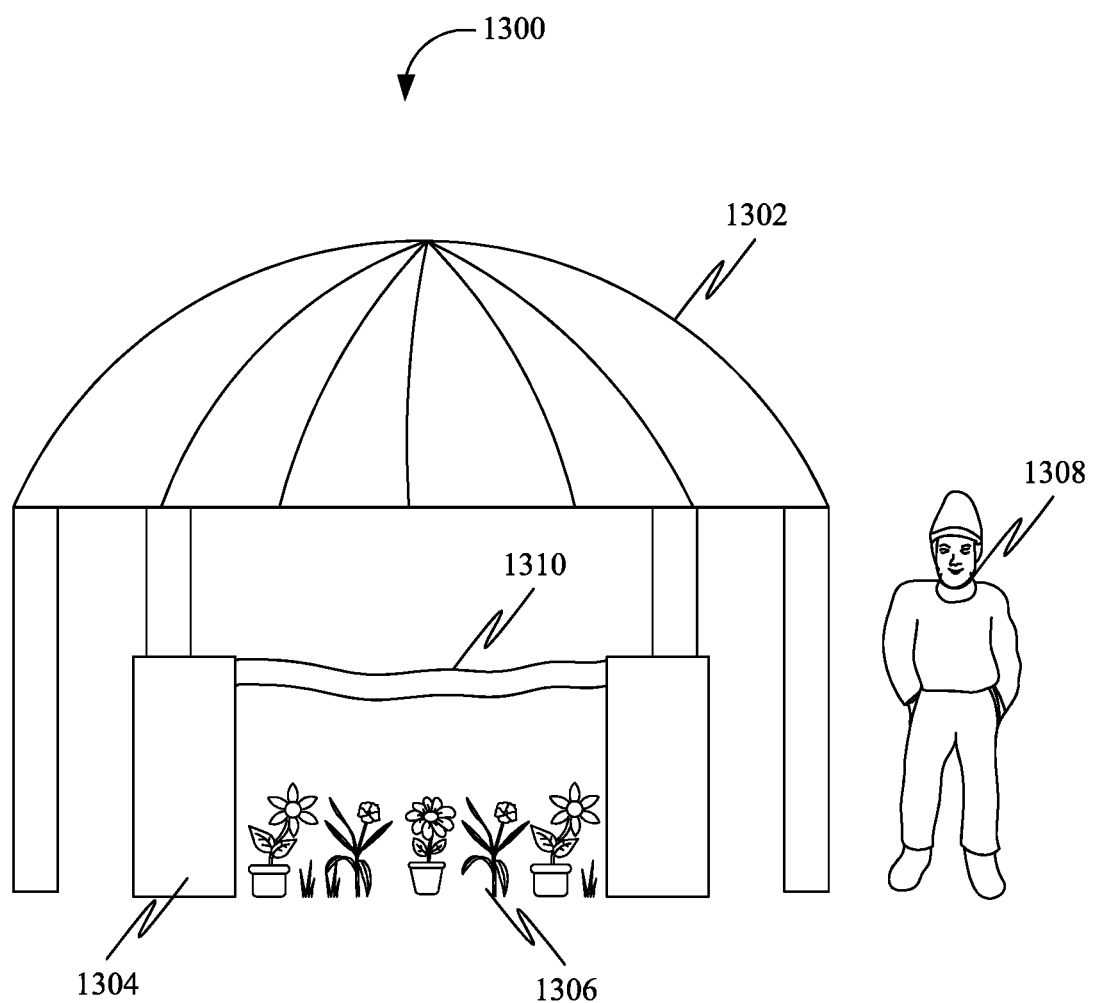
FIG. 13 is a schematic showing an artificial climate control system, in accordance with some embodiments.

FIG. 13 is a schematic showing an artificial climate control system 1300, in accordance with some embodiments. Further, the artificial climate control system 1300 may include an umbrella canopy/dome 1302, a water cooler dispenser machine 1304, a vegetation cover 1306, and a gardener 1308. Further, the umbrella canopy/dome 1302 may include a plurality of panels (not shown). Further, the plurality of panels may include solar panels, shine to glow light panels, breeze fan and vent panels, and heating, shield window panels, etc. Further, the water cooler dispenser machine 1304 may include a plurality of water dispensers and piping or tubing. Further, the vegetation cover 1306 may include grass, potted flowers, planted tomatoes, etc. Further, the system may facilitate automated carefree gardening especially in regions where grass, flowers, plants, etc. are difficult to grow. Further, the artificial climate control system 1300 may include a piping 1310 for facilitating condensation of vapor.

Figure 14:
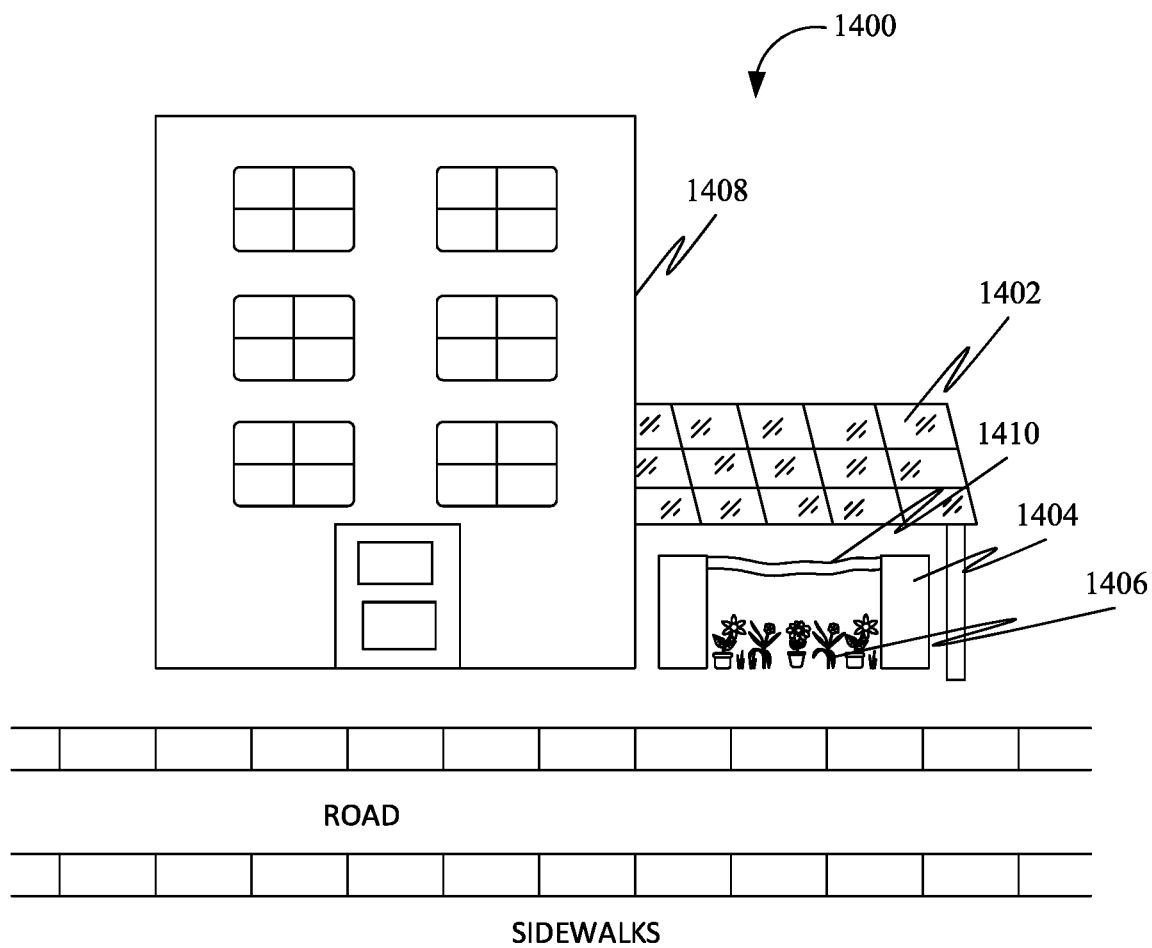
FIG. 14 is a schematic showing an artificial climate control system near a building, in accordance with some embodiments.

FIG. 14 is a schematic showing an artificial climate control system 1400 near a building 1408, in accordance with some embodiments. Further, the artificial climate control system 1400 may include an umbrella canopy/dome 1402, a water cooler dispenser machine 1404, and a vegetation cover 1406. Further, the umbrella canopy/dome 1402 may include a plurality of panels. Further, the plurality of panels may include solar panels, shine to glow light panels, breeze fan and vent panels, and heating, shield window panels, etc. Further, the water cooler dispenser machine 1404 may include a plurality of water dispensers and piping or tubing 1410. Further, the vegetation cover 1406 may include grass, potted flowers, planted tomatoes, etc. Further, in some embodiments, the artificial climate control system 1400 may be set up on the top or back of the building 1408.

Figure 15:
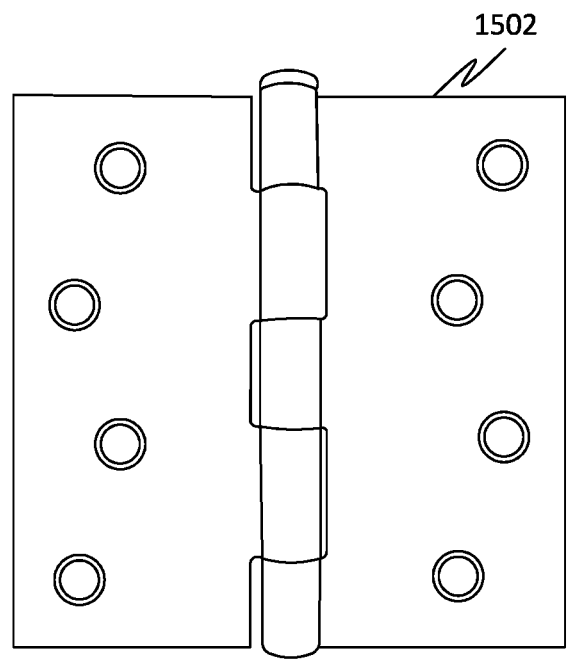
FIG. 15 is a front view of a standard hinge for facilitating opening and closing of panels, in accordance with some embodiments.

FIG. 15 is a front view of a plate hinge 1502 for facilitating opening and closing of panels, in accordance with some embodiments. Further, the plate hinge 1502 may facilitate in keeping hinging parts in place. Further, the hinging parts may facilitate restricting birds from resting on the panels and keeping the panels clean. Further, the opening and closing of the panels may be used to allow intake and outtake of air. Further, the plate hinge 1502 may facilitate in lifting the panels to a lift-angle for panel frame or panel framing placements.

Figure 16:
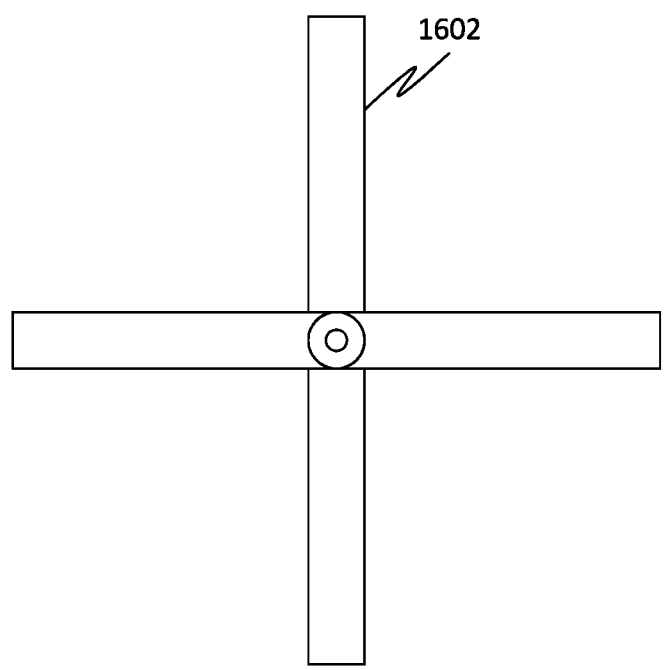
FIG. 16 is a top view of a standard roll side hinge, in accordance with some embodiments.

FIG. 16 is a top view of a standard roll side hinge 1602, in accordance with some embodiments.

Figure 17:
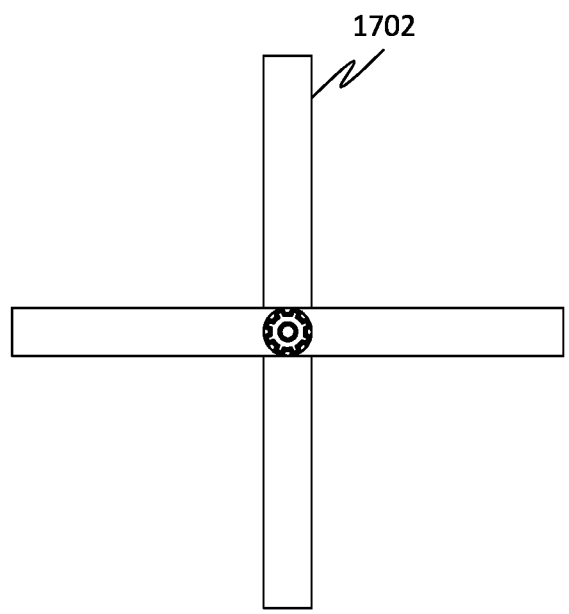
FIG. 17 is a top view of a geared roll side hinge, in accordance with some embodiments.

FIG. 17 is a top view of a geared roll side hinge 1702, in accordance with some embodiments. Further, the geared roll side hinge 1702 may be operated manually or automatically using a motor.

Figure 18:
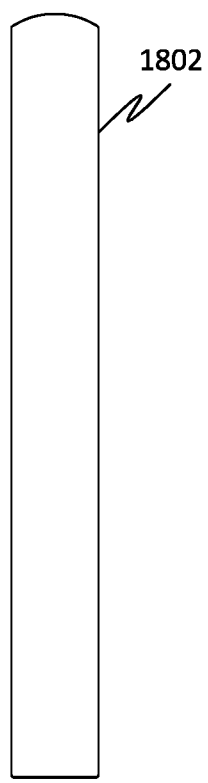
FIG. 18 is a front view of a secure hold rod for keeping a panel open, in accordance with some embodiments.

FIG. 18 is a front view of a secure hold rod 1802 for keeping a panel open, in accordance with some embodiments.

Figure 19:
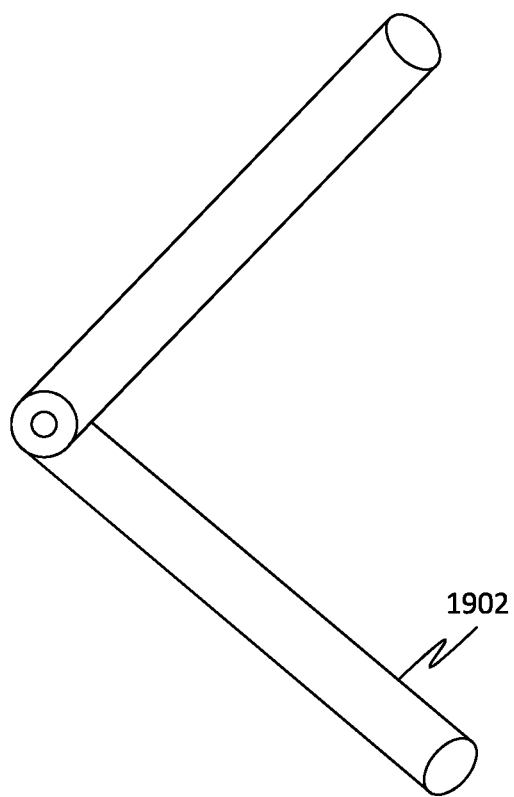
FIG. 19 is a front view of a standard rod, in accordance with some embodiments.

FIG. 19 is a front view of a standard rod 1902, in accordance with some embodiments. Further, the standard rod 1902 may be operated manually or automatically using a motor.

Figure 20:
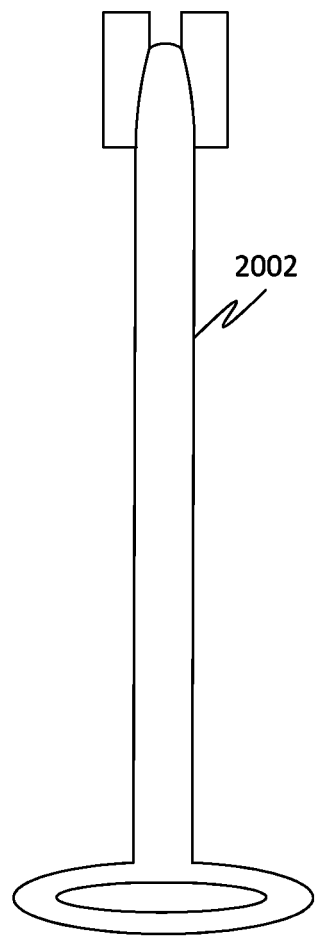
FIG. 20 is a front view of a push-pull-crank hand-held rod for opening and closing of panels, in accordance with some embodiments.

FIG. 20 is a front view of a push-pull-crank hand-held rod 2002 for opening and closing of panels, in accordance with some embodiments.

Figure 21:
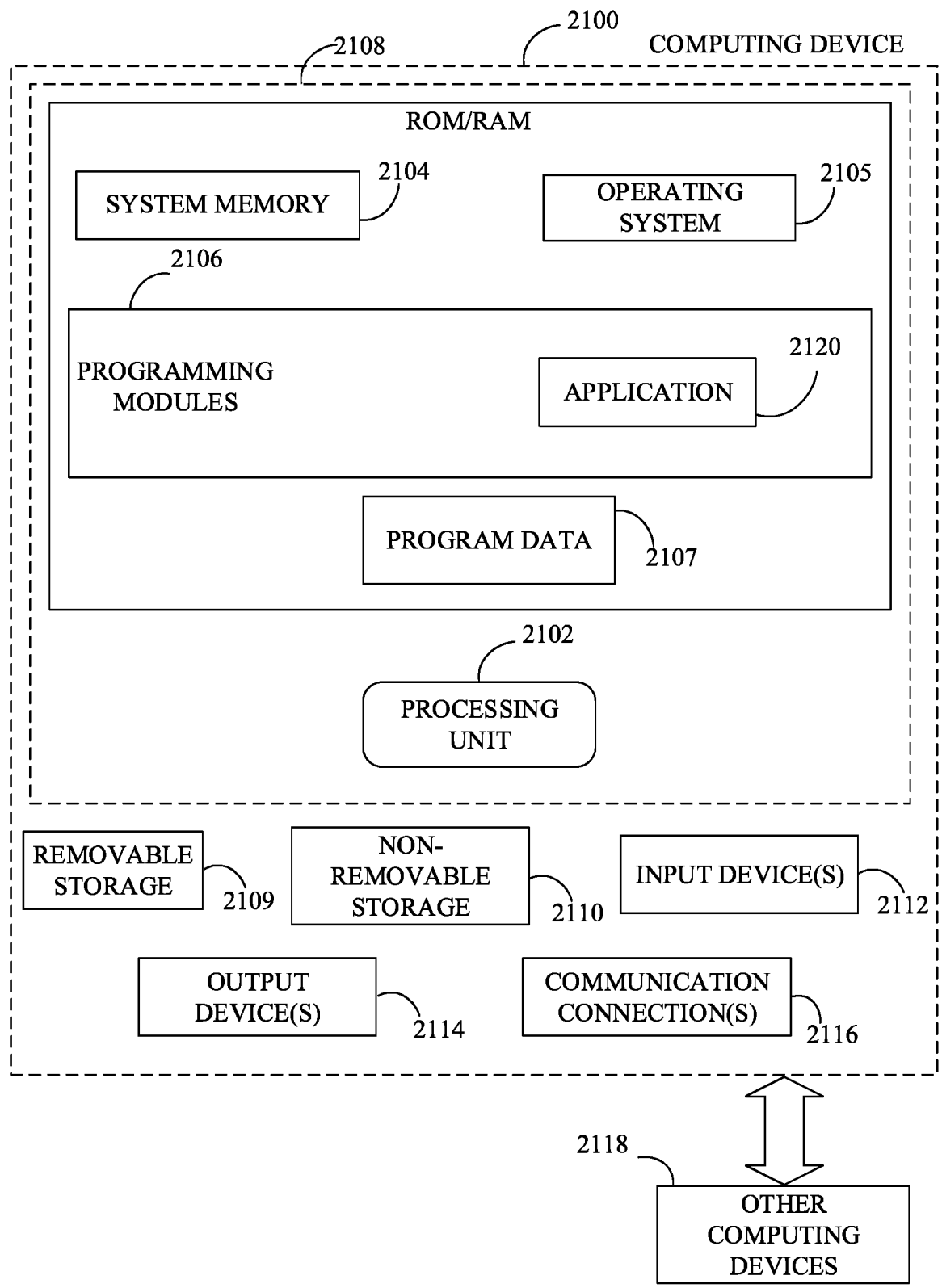
FIG. 21 is a block diagram of a computing device for implementing the methods disclosed herein, in accordance with some embodiments.

With reference to FIG. 21, a system consistent with an embodiment of the disclosure may include a computing device or cloud service, such as computing device 2100. In a basic configuration, computing device 2100 may include at least one processing unit 2102 and a system memory 2104. Depending on the configuration and type of computing device, system memory 2104 may comprise, but is not limited to, volatile (e.g. random-access memory (RAM)), non-volatile (e.g. read-only memory (ROM)), flash memory, or any combination. The system memory 2104 may include operating system 2105, one or more programming modules 2106, and may include a program data 2107. Operating system 2105, for example, may be suitable for controlling computing device 2100's operation. In one embodiment, programming modules 2106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 21 by those components within a dashed line 2108.

The computing device 2100 may have additional features or functionality. For example, the computing device 2100 may also include additional data storage devices (removable and/or non-removable) such as, for example, magnetic disks, optical disks, or tape. Such additional storage is illustrated in FIG. 21 by a removable storage 2109 and a non-removable storage 2110. Computer storage media may include volatile and non-volatile, removable and non-removable media implemented in any method or technology for storage of information, such as computer-readable instructions, data structures, program modules, or other data. System memory 2104, removable storage 2109, and non-removable storage 2110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2100. Any such computer storage media may be part of device 2100. Computing device 2100 may also have input device(s) 2112 such as a keyboard, a mouse, a pen, a sound input device, a touch input device, a location sensor, a camera, a biometric sensor, etc. Output device(s) 2114 such as a display, speakers, a printer, etc. may also be included. The aforementioned devices are examples and others may be used.

Computing device 2100 may also contain a communication connection 2116 that may allow device 2100 to communicate with other computing devices 2118, such as over a network in a distributed computing environment, for example, an intranet or the Internet. Communication connection 2116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 2104, including operating system 2105. While executing on processing unit 2102, programming modules 2106 (e.g., application 2120 such as a media player) may perform processes including, for example, one or more stages of methods, algorithms, systems, applications, servers, databases as described above. The aforementioned process is an example, and processing unit 2102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating artificial climate control, the system comprising:
    a greenhouse enclosure comprising an internal space, wherein the greenhouse enclosure is configured for generating a greenhouse effect;
    a condensation assembly configured for condensing water vapor present in the interior space, wherein the condensation assembly comprises:
        at least one coolant dispenser configured for dispensing a coolant,
        a heat exchanger fluidly coupled with the at least one coolant dispenser, wherein the heat exchanger is configured for receiving the coolant from the at least one coolant dispenser, wherein the heat exchanger facilitates heat exchange between the coolant and the interior space to condense the water vapor;
        a coolant sensor configured for generating at least one coolant data, wherein the coolant sensor is configured for detecting at least one coolant parameter of the coolant, wherein the generating of the at least one coolant data is based on the detecting of the at least one coolant parameter, wherein the at least one coolant parameter comprises a quantity of the coolant; and
        at least one coolant dispensing actuator operably coupled to the at least one coolant dispenser, wherein the at least one coolant dispensing actuator is configured for controlling the dispensing of the coolant based on at least one command;
    at least one sensor configured for generating at least one sensor data, wherein the at least one sensor is configured for detecting at least one external environment parameter associated with an exterior space outside the greenhouse enclosure and at least one internal environment parameter associated with the interior space, wherein the generating of the at least one sensor data is based on the detecting of the at least one external environment parameter and the at least one internal environment parameter;
    a water collection compartment fluidly coupled with the condensation assembly, wherein the water collection compartment is configured for storing water upon condensing of the water vapor; and
    a processing device communicatively coupled to each of the at least one sensor and the coolant sensor, wherein the processing device is communicatively coupled to at least one of the at least one coolant dispensing actuator and at least one sunshade actuator, wherein the processing device is configured for:
        analyzing at least one of the at least one sensor data and the at least one coolant sensor data; and
        generating the at least one command based on the analyzing, wherein at least one of the at least one coolant dispenser, the at least one coolant dispensing actuator, the at least one sunshade actuator, and the processing device is electrically powered by a power source.

2. The system of claim 1, wherein the greenhouse enclosure comprises:
    at least one sunshade panel configured for blocking light from entering the interior space, wherein the at least one sunshade panel is movably coupled to the greenhouse enclosure using a sunshade connection mechanism; and
    the at least one sunshade actuator operably coupled to the at least one sunshade panel, wherein the at least one sunshade actuator is configured for transitioning the at least one sunshade panel through two or more operational states based on at least one command, wherein the at least one sunshade panel in an open operational state of the two or more operational states allows the light to enter the interior space, wherein the at least one sunshade panel in a closed operational state of the two or more operational states blocks the light to enter the interior space.

3. The system of claim 2, wherein the at least one sunshade panel is characterized by a geometrical contour, wherein the geometrical contour comprises one of triangle, square, and a rectangle.

4. The system of claim 2, wherein the at least one sunshade panel comprises at least two of a shine to glow light panel, a breeze fan and vent panels, a heating and shield window panel, and a shade screen panel, wherein the shine to glow light panel comprises a luminous artificial solar radiation flash lighting for providing solar power in absence of sunlight, wherein the breeze fan and vent panel comprises a fan configurable for reversing a direction of air from the interior space to the exterior space, wherein the heating and shield window panel comprises a heating element and a shield for preventing a flow of heat between the interior space and the exterior space, wherein the shade screen panel blocks and absorbs the heat of the sun.

5. The system of claim 2, wherein the at least one sunshade panel comprises at least one sunshade sensor communicatively coupled with the processing device, wherein the at least one sunshade sensor is configured for sensing the two or more operational states associated with the at least one sunshade panel, wherein the generating of the at least one command is based on the sensing of the two or more operational states.

6. The system of claim 2, wherein the sunshade connection mechanism comprises one of a plate hinge, a roll side hinge, a motorized geared roll side hinge, and a geared roll side hinge.

7. The system of claim 1 further comprising a water dispenser coupled with the water collection compartment for dispensing the water for drip irrigation.

8. The system of claim 1 further comprising a humidifier configured for humidifying the interior space.

9. The system of claim 1, wherein the power source comprises a rechargeable power source, wherein the at least one sunshade panel comprises a solar panel configured for generating electric power, wherein the electric power charges the rechargeable power source.

10. The system of claim 1 further comprising a vegetation sensor configured for sensing a health condition of vegetation disposed in the interior space, wherein the vegetation sensor is communicatively coupled with the processing device, wherein the generating of the at least one command is further based on the sensing of the health condition.

11. The system of claim 1, wherein the heat exchanger comprises a conduit configured for allowing passage of the coolant.

12. The system of claim 1 further comprising a communication device, wherein the communication device is configured for receiving at least one weather data from at least one first external device, wherein the processing device is further configured for analyzing the at least one weather data, wherein the generating of the at least one command is based on the analyzing of the at least one weather data.

13. The system of claim 12, wherein the processing device is configured for generating an emergency weather notification based on the analyzing of the at least one weather data, wherein the communication device is configured for transmitting the emergency weather notification to at least one second external device.

14. A system for facilitating artificial climate control, the system comprising:
a greenhouse enclosure comprising an internal space, wherein the greenhouse enclosure is configured for generating a greenhouse effect, wherein the greenhouse enclosure comprises:
at least one sunshade panel configured for blocking light from entering the interior space, wherein the at least one sunshade panel is movably coupled to the greenhouse enclosure using a sunshade connection mechanism; and
at least one sunshade actuator operably coupled to the at least one sunshade panel, wherein the at least one sunshade actuator is configured for transitioning the at least one sunshade panel through two or more operational states based on at least one command, wherein the at least one sunshade panel in an open operational state of the two or more operational states allows the light to enter the interior space, wherein the at least one sunshade panel in a closed operational state of the two or more operational states blocks the light to enter the interior space;
a condensation assembly configured for condensing water vapor present in the interior space, wherein the condensation assembly comprises:
at least one coolant dispenser configured for dispensing a coolant,
a heat exchanger fluidly coupled with the at least one coolant dispenser, wherein the heat exchanger is configured for receiving the coolant from the at least one coolant dispenser, wherein the heat exchanger facilitates heat exchange between the coolant and the interior space to condense the water vapor;
a coolant sensor configured for generating at least one coolant data, wherein the coolant sensor is configured for detecting at least one coolant parameter of the coolant, wherein the generating of the at least one coolant data is based on the detecting of the at least one coolant parameter, wherein the at least one coolant parameter comprises a quantity of the coolant; and
at least one coolant dispensing actuator operably coupled to the at least one coolant dispenser, wherein the at least one coolant dispensing actuator is configured for controlling the dispensing of the coolant based on the at least one command;
at least one sensor configured for generating at least one sensor data, wherein the at least one sensor is configured for detecting at least one external environment parameter associated with an exterior space outside the greenhouse enclosure and at least one internal environment parameter associated with the interior space, wherein the generating of the at least one sensor data is based on the detecting of the at least one external environment parameter and the at least one internal environment parameter;
a water collection compartment fluidly coupled with the condensation assembly, wherein the water collection compartment is configured for storing water upon condensing of the water vapor;
a processing device communicatively coupled to each of the at least one sensor and the coolant sensor, wherein the processing device is communicatively coupled to at least one of the at least one coolant dispensing actuator and the at least one sunshade actuator, wherein the processing device is configured for:
analyzing at least one of the at least one sensor data and the at least one coolant sensor data; and
generating the at least one command based on the analyzing; and
a power source configured for powering at least one of the at least one coolant dispenser, the at least one coolant dispensing actuator, the at least one sunshade actuator, and the processing device.

15. The system of claim 14 further comprising a water dispenser coupled with the water collection compartment for dispensing the water for drip irrigation.

16. The system of claim 14 further comprising a humidifier configured for humidifying the interior space.

17. The system of claim 14, wherein the at least one sunshade panel comprises at least one sunshade sensor communicatively coupled with the processing device, wherein the at least one sunshade sensor is configured for sensing the two or more operational states associated with the at least one sunshade panel, wherein the generating of the at least one command is based on the sensing of the two or more operational states.

18. The system of claim 14, wherein the power source comprises a rechargeable power source, wherein the at least one sunshade panel comprises a solar panel configured for generating electric power, wherein the electric power charges the rechargeable power source.

19. The system of claim 14 further comprising a vegetation sensor configured for sensing a health condition of vegetation disposed in the interior space, wherein the vegetation sensor is communicatively coupled with the processing device, wherein the generating of the at least one command is further based on the sensing of the health condition.

20. The system of claim 14 further comprising a communication device, wherein the communication device is configured for receiving at least one weather data from at least one first external device, wherein the processing device is further configured for analyzing the at least one weather data, wherein the generating of the at least one command is based on the analyzing of the at least one weather data.

\* \* \* \* \*